United States Patent
Panizzolo et al.

(10) Patent No.: US 6,616,158 B2
(45) Date of Patent: Sep. 9, 2003

(54) AXLE POSITION SENSOR SYSTEM FOR INDUSTRIAL VEHICLES

(75) Inventors: Fabrizio Panizzolo, Padova (IT); Tiziano Gamba, Trento (IT)

(73) Assignee: Dana Italia S.p.A., Arco (IT)

( * ) Notice: Subject to any disclaimer, the term of this patent is extended or adjusted under 35 U.S.C. 154(b) by 0 days.

(21) Appl. No.: 10/013,082

(22) Filed: Dec. 10, 2001

(65) Prior Publication Data

US 2002/0070521 A1 Jun. 13, 2002

(30) Foreign Application Priority Data

Dec. 11, 2000 (IT) .................................... MI2000A2659

(51) Int. Cl.⁷ .......................... B60G 9/02; B60G 17/015
(52) U.S. Cl. .............................. 280/124.111; 280/5.508; 180/352
(58) Field of Search .......................... 280/5.508, 6.154, 280/124.106, 124.111, 124.112, 124.113, 124.157, 5.514, 6.159, 6.16, 124.11; 180/352, 349, 378

(56) References Cited

U.S. PATENT DOCUMENTS 6,293,022 B1 * 9/2001 Chino et al. .............. 33/203.18

FOREIGN PATENT DOCUMENTS

| EP | 0423080 A1 | * | 4/1991 |
| EP | 0916528 A2 | * | 5/1999 |
| JP | 409300930 A | * | 11/1997 |

* cited by examiner

Primary Examiner—Peter C. English
(74) Attorney, Agent, or Firm—Hedman & Costigan, P.C.

(57) ABSTRACT

A system for sensing the spatial position of suspended axles in industrial vehicles includes two angular sensors (32) fitted on opposite pins (26), each of which is provided with a relative spherical coupling (27) for a panhard bar (16) interposed between an axle (11) and the chassis (15) of the industrial vehicle. Each of the sensors (32) interposed between the axle (11) and the chassis (15) of the industrial vehicle is operated by elastic laminas (35, 36) and each sensor has a drive pin rotated by a corresponding rotating hub (34), the angular sensors (32) detecting the spatial oscillations of the panhard bar (16) in relation to the axle (11) and the chassis (15) of the industrial vehicle. There are two elastic laminas (35, 36) for each angular sensor (32) and these are fitted parallel to a lateral surface of the panhard bar (16), partially overlapping one another and fixed at one end to one of the angular sensors (32) and at the other end to the surface of the panhard bar (16).

4 Claims, 4 Drawing Sheets

AXLE POSITION SENSOR SYSTEM FOR INDUSTRIAL VEHICLES

The present application claims priority to Italian Patent Application Serial No. MI 2000A 002659, filed Dec. 11, 2000.

BACKGROUND OF THE INVENTION

The present invention relates to a control device of the spatial position in a suspended axle for industrial vehicles, in particular of the type with articulated connection.

It must be taken into account that an axle of the aforesaid type is designed to be mounted on industrial vehicles, such as lift trucks, front loaders, backhoe loaders, graders, tractors or similar.

This type of axle with articulated connection essentially comprises a central casing from which two arms extend, each carrying, at one of its ends, a wheel support. The axle is connected to the chassis of the industrial vehicle by transverse and longitudinal bars in relation to the vehicle, where the transversal bar is composed of a panhard bar, and moreover, damping elements are interposed between the axle and the chassis.

When the industrial vehicle is moved and in use, there is a problem in knowing the spatial position of at least one of the axles in relation to the chassis for correct movement of the vehicle.

For this purpose, appropriate sensors should be fitted to check, moment by moment, the spatial position of the axle involved; however, it is difficult to position these as a plurality of variables are involved.

In fact, the sensors are affected by elements external to the vehicle that may even break and deactivate them and, moreover, they must be suitable for the various types of chassis of the vehicle.

Moreover, the accelerations to which the components of the vehicle are subjected could in turn overload the sensors if they were not appropriately supported and protected. All this causes possible imprecision in measurements, if not the actual breakage of the sensor, thus causing failure of the sensor system and causing loss of reliability of the measurement.

SUMMARY OF THE INVENTION

The object of the present invention is to eliminate the technical problems expounded, by providing a system for sensing the spatial position of suspended axles in industrial vehicles, which is implemented using a limited number of reaction elements in relation to the chassis and with a position of the sensors that guarantees safe positioning of the sensors in relation to the chassis of the vehicle.

Another object of the present invention is to provide a sensor system connected to an axle that can be installed under the chassis of the vehicle in an essentially simple manner and in a protected area that is not exposed to possible knocks against external obstacles.

Yet another object of the present invention is to provide a system for sensing the spatial position of suspended axles in industrial vehicles that is essentially simple, safe and reliable, both in its construction and in its operating position.

These objects according to the present invention are obtained by providing a control sensor system of the spatial position in a suspended axle for industrial vehicles, in particular of the type with articulated connection, comprising two angular sensors (32) fitted on opposite pins (26), each of which is provided with a spherical coupling (27) for a panhard bar (16), having a first end and a second end, connected between an axle (11) and a chassis (15) of said industrial vehicle, said angular sensors (32) being capable of detecting angular oscillations of said panhard bar (16) in relation to said axle (11) and said chassis (15) of said industrial vehicle each of said angular sensors (32) being interposed between said axle (11) and chassis (15) of said industrial vehicle said system having elastic laminas (35, 36) and a rotating hub (34) for transmitting oscillation of said panhard bar to said angular sensors.

Other characteristics of the present invention are further defined in the disclosure.

Advantageously, the sensor system according to the present invention permits an increase in the safety and control of the vehicle obtaining an expansion in the operating possibilities of the industrial vehicle. In fact, the sensor system according to the invention allows the vehicle to move faster and with greater safety, in routes of any condition. This permits the stability limits to be identified and, working if necessary in conditions in close proximity to the measured limit (although remaining within an appropriate safety range of the vehicle), to obtain maximum performance and reduce the idle times of the vehicle to thus obtain a considerable economic return.

Moreover, vehicles fitted with the sensor system according to the present invention, which is used to control the position of the suspended axle, are safer and easier to drive in relation to those with axles on which the sensor system is not fitted. Thus, driving is more comfortable and there is an overall reduction in stress and fatigue for the operator of the industrial vehicle.

BRIEF DESCRIPTION OF THE DRAWINGS

Further characteristics and advantages of a system for sensing the spatial position of suspended axles in industrial vehicles, according to the present invention, will emerge more evidently from the ensuing description, given to provide a non-limiting example, with reference to the annexed schematic drawings, in which.

DETAILED DESCRIPTION OF THE INVENTION

Figure 1:
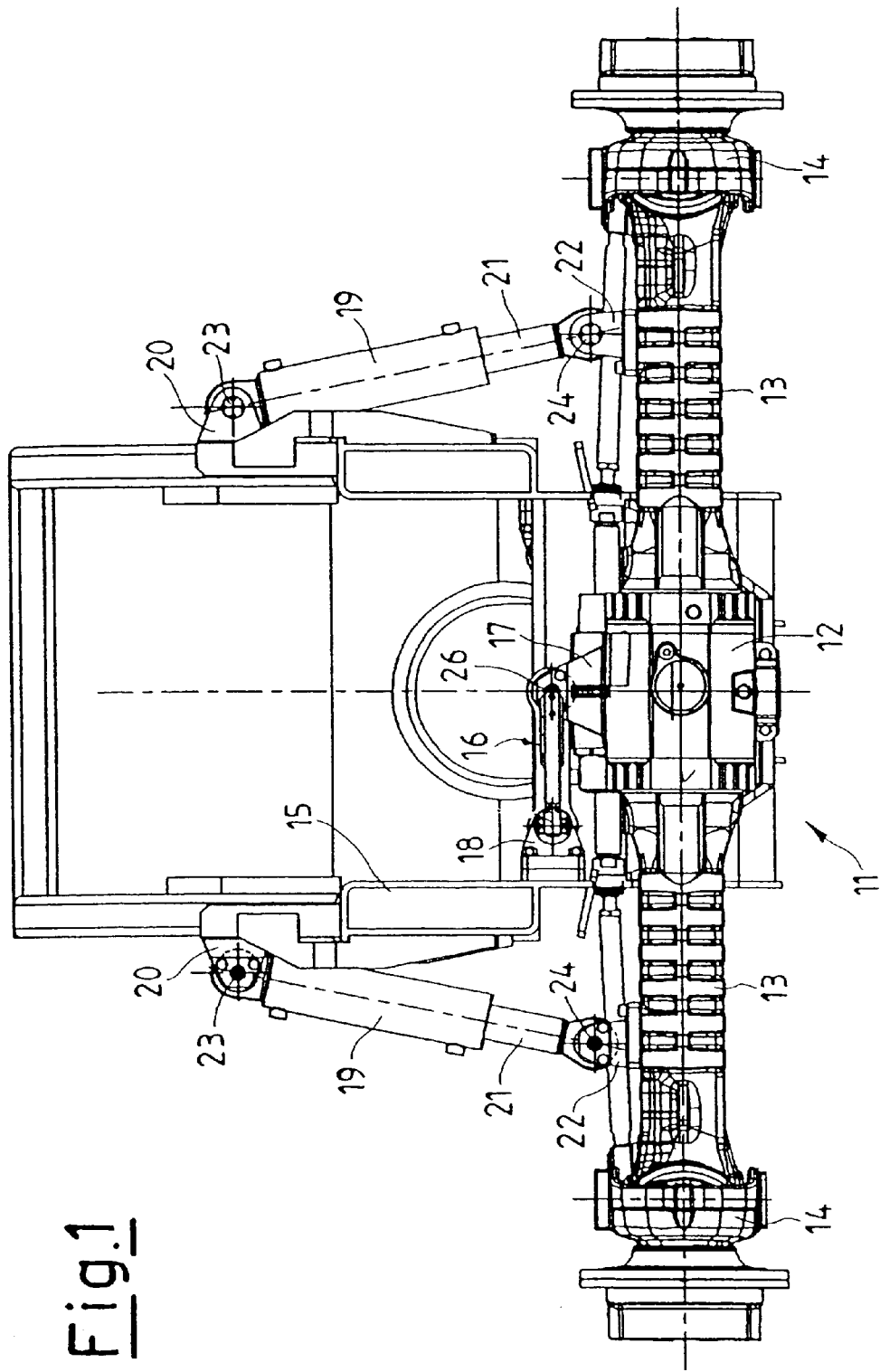
FIG. 1 shows a schematic perspective view of a suspended axle for industrial vehicles fitted with a position sensor system according to the present invention.
Figure 2:
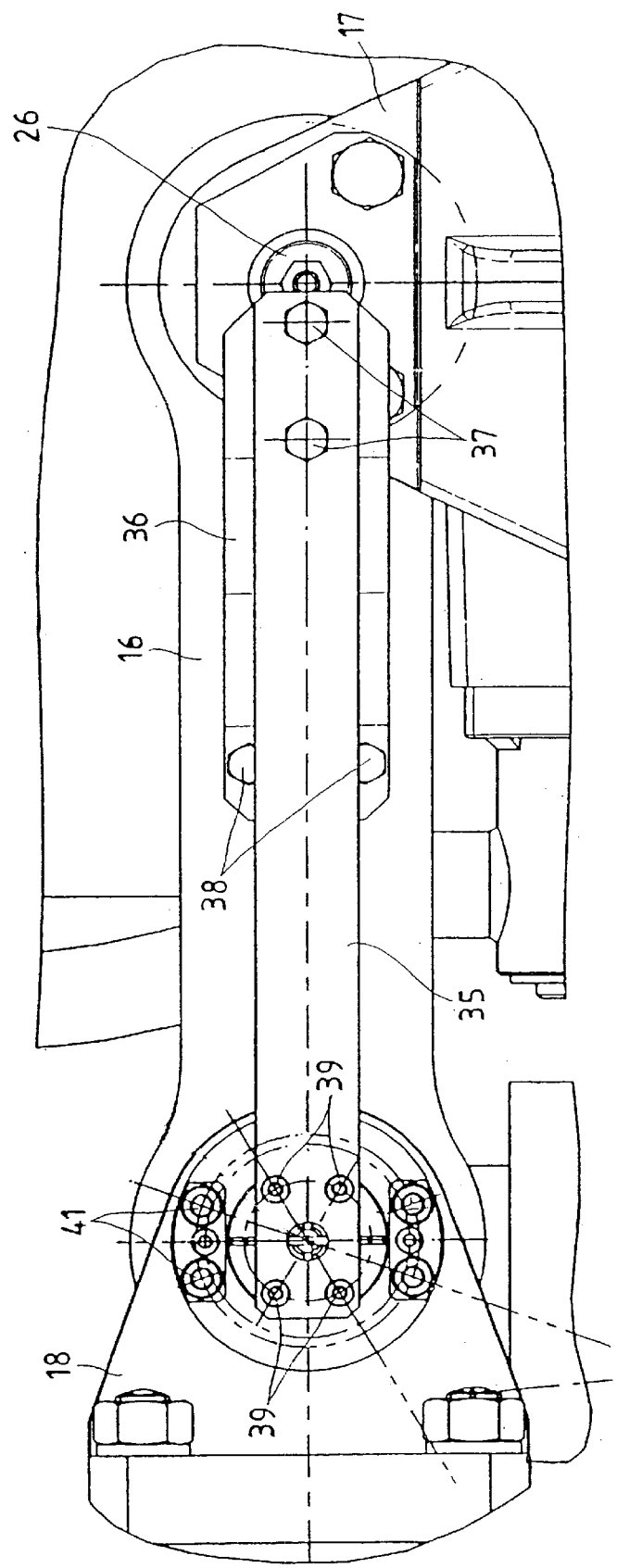
FIG. 2 shows an enlarged front view of the application of the sensor system in an axle such as the one in FIG. 1.
Figure 3:
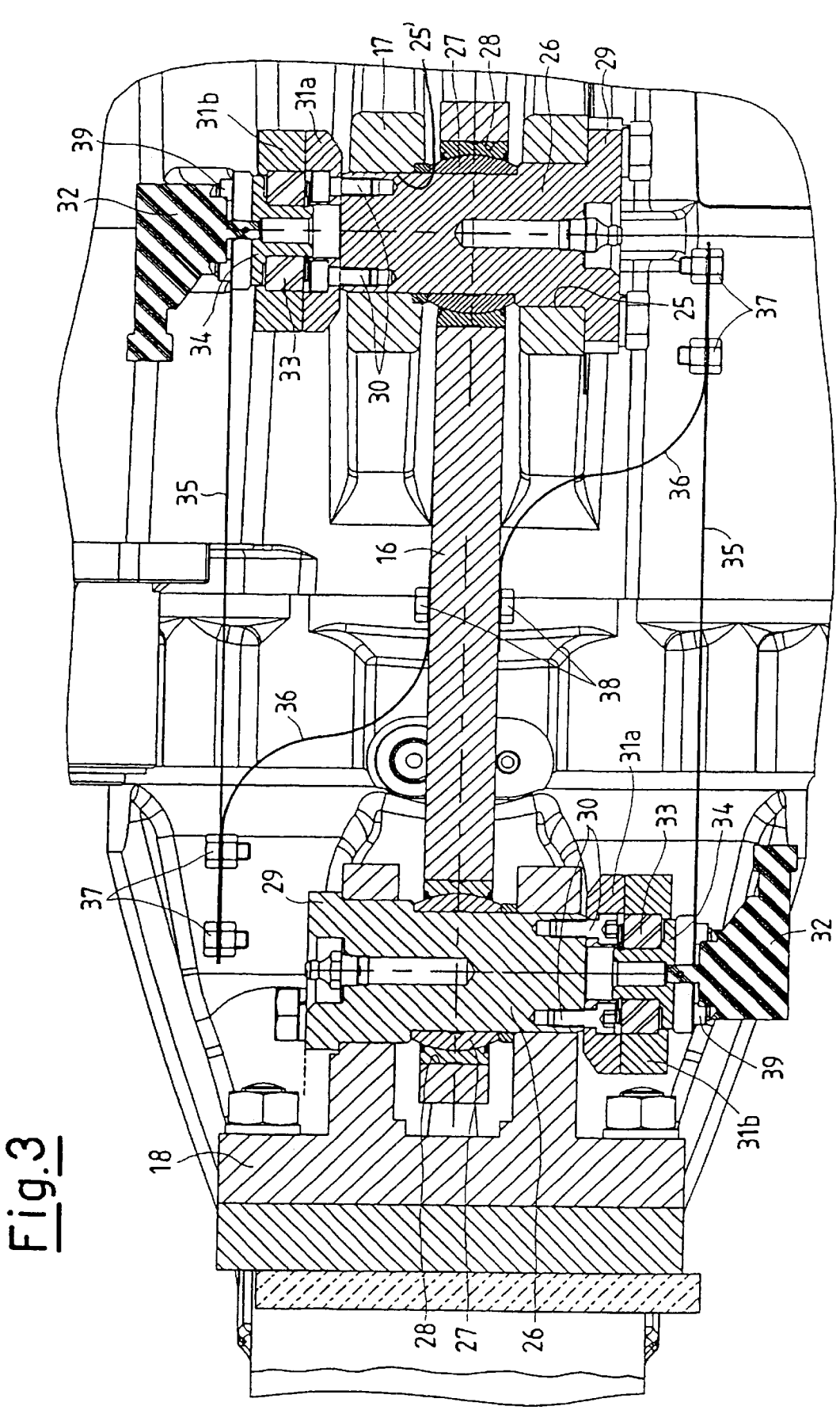
FIG. 3 shows an enlarged section taken along the longitudinal axis of the panhard reaction bar shown in FIG. 2.
Figure 4:
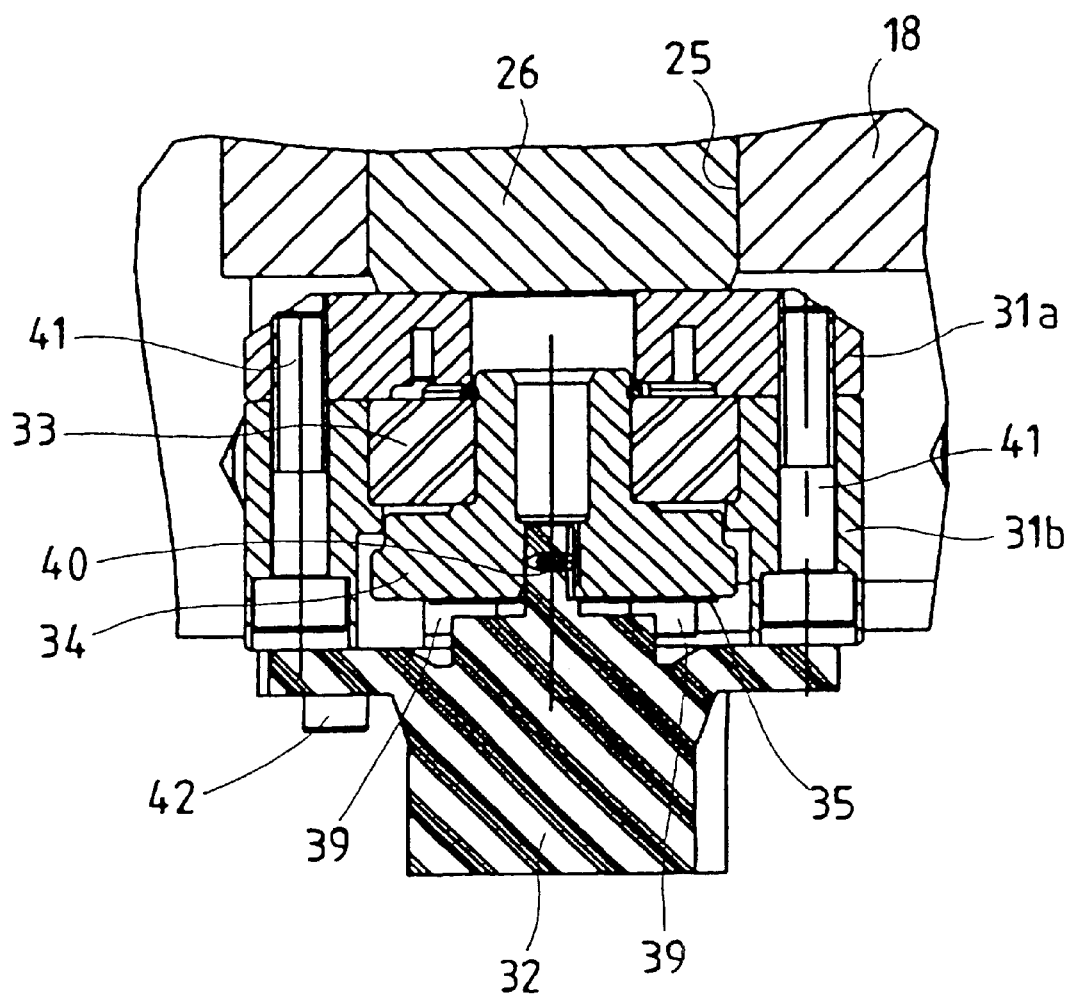
FIG. 4 shows an enlarged section of a connection of the angular sensor to the corresponding support and shows the related connections.

FIG. 1 schematically illustrates the structure of a suspended axle for industrial vehicles, of the type with articulated connections, fitted with an axle position sensor system according to the present invention.

In brief, it can be seen in this figure that one axle 11, for example, of the two or more provided on the vehicle, comprises a central casing 12 from which two arms 13 extend. It can also be noted that one end of each of the two arms 13 is fitted with a support 14 of a wheel, not shown.

The axle 11 according to the invention is also connected to a chassis 15 of the industrial vehicle both by transverse and longitudinal bars in relation to the vehicle.

The transverse bar is provided by means of a panhard bar 16 hinged at one end to a bracket 17, integral with the casing 12 of the axle 11, and at the other end to another bracket 18 integral with the chassis 15 of the industrial vehicle. The brackets 17 and 18 are in fact supporting elements of the articulation pins of the panhard bar 16.

Couplings between the panhard bar 16 and the brackets or supports 17 and 18 is provided by hinges with ball coupling.

Moreover, damping elements 19 can be interposed between the axle 11 and the chassis 15 of the industrial vehicle. These damping elements 19 are preferably composed of double-acting hydraulic cylinders hinged at 23 on one side directly to brackets 20, integral with the chassis 15. Rods 21 of the hydraulic cylinders are hinged at 24 to brackets 22 integral with the arms 13 of the axle 11. The hydraulic cylinders 19 are fed by a hydraulic control unit controlled electronically with the aid of the sensor system of the present invention. This control permits greater sensitivity to the load burdening the damping elements 19 and to the corresponding effect on the position of the vehicle and also permits excursion to be limited and enabling of a self-levelling function that may possibly be provided on the vehicle.

The axle position sensor system for industrial vehicles according to the present invention is fitted on the panhard bar 16 and the brackets or supports 17 and 18 in relation to the casing 12 of the axle 11 and to the chassis 15 of the industrial vehicle.

The device is essentially composed of two angular sensors fitted on the opposite pins of the panhard bar 16 to detect the angular oscillations of the panhard bar 16 in relation both to the casing 12 of the axle 11 and to the chassis 15 of the industrial vehicle on which they are installed.

In particular, starting from the chassis side 15 of the industrial vehicle on a first lateral surface of the panhard bar 16 the following arrangement is envisaged.

The bracket 18 is fork-shaped and is provided with two holes 25 and 25' in its two arms, said holes 25 and 25' housing a pin 26, also fixed to the fork-shaped bracket 18. Supported on this pin 26 is a ball bearing 27 having an external part housed, in a through hole 28 machined in a first end of the panhard bar 16.

At one side, the pin 26 has an enlarged head 29 which abuts externally on an arm of the fork-shaped bracket 18, while on the other side the pin 26 carries, fixed by axially extending bolts 30, a first support part 31a connected to a second support part 31b which supports the stationary part of a first angular sensor 32.

Placed inside the two part support 31a and 31b, with a bearing 33 interposed, is a rotating hub 34, fixed to which, by means of bolts 39, is one end of a first lamina 35. A drive pin 40 of the rotating part of the angular sensor 32 is fixed to the hub 34. The sensor 32 is fixed by bolts 42 to the second support part 31b which is in turn fixed to the first support part 31a by means of further bolts 41.

The first lamina 35 is made of spring steel and extends parallel to a first lateral surface of the panhard bar 16. Fixed to an opposite end of the first laminate 35 by bolts 37 is one end of a second lamina 36, made of the same material. Although having a curved surface, the entire surface of the second lamina 36 extends along one of the sides of the first lamina 35. The curved elastic lamina 36 turns back towards its connection point, where it is fixed by bolts 38 on the first lateral surface of the panhard bar 16. In order for the entire system to operate the angular sensors are constrained by any possible oscillations of the panhard bar, wherein the panhard bar is fixed by spherical anchors to the chassis.

The layout of the second angular sensor on the other part of the panhard bar 16 must now be considered in relation to the support 17 connected to the casing 12 of the axle 11.

The layout is exactly the same and the same numbers of reference are indicated for parts with identical functions.

On this second side of the panhard bar 16 the following layout is thus envisaged.

The bracket 17 is also fork-shaped and is provided with two holes 25 and 25' in its two arms. Said holes 25 and 25' house a pin 26, also fixed to the fork-shaped bracket 17. Supported on this pin 26 is the internal part of a ball bearing 27 which is housed in a through hole 28 machined in a second end of the panhard bar 16.

On one side the pin 26 has an enlarged head 29 which abuts externally on an arm of the fork-shaped bracket 17, while on the other side the pin 26 carries, fixed by bolts 30 a support 31a and 31b that supports the stationary part of the second angular sensor 32.

Placed inside the support 31a and 31b, with a bearing 33 interposed, is a rotating hub 34, fixed to which is both one end of a third lamina 35 and the drive pin 40 of the rotating part of the angular sensor 32, the pin being fixed to the hub 34.

The third lamina 35 is made of spring steel and extends parallel to the panhard bar 16 and fixed to its opposite end by bolts 37 is one end of a fourth lamina 36, made of the same material, and extending along one of the sides of the third lamina 35. At the other end, the fourth lamina 36 is fixed by bolts 38 on the second lateral surface of the panhard bar 16, thus, the fourth lamina 36 is constrained by any possible oscillation of the panhard bar that is allowed by the ball bearing 27.

A pair of such angular sensors connected to the panhard bar 16 as described above allow movement of the axle space in relation to the chassis to be detected, to allow any correction operation, if necessary and requested.

In fact, the position of the axle in the space in relation to the chassis can be unequivocally recognized.

The aforesaid hydraulic control unit controlled electronically and commanded by the position of the two angular sensors can in fact activate one or more of the damping elements 19. This is required, for example, to vary their excursion in order to perform a self-levelling function for the entire vehicle or change the position to the extent deemed necessary by the terrain and inclination of the vehicle.

The function of a system for controlling the spatial position of suspended axles in industrial vehicles, in particular suspended axles supported by a panhard bar 16 with articulated connections is evident from the above description.

It is evident that each axle 11 contributes towards supporting the industrial vehicle, in particular balancing transverse stresses by means of the panhard bar 16 and longitudinal stresses by means of the specific devices, such as a longitudinal strut or similar. Vertical stresses are balance by the damping elements 19.

It can be hypothesized that owing to stresses caused, for example, by uneven ground across which the industrial vehicle is moving, the axle 11 oscillates.

The different extent of these oscillations is dampened by the damping elements 19 and is detected by the angular sensors 32.

This is permitted by the presence of the sensor system according to the present invention that detects the change in the position of each axle in relation to the chassis.

The movement of the panhard bar 16 in relation to the chassis is detected by the angular rotations of the pair of laminas 35 and 36 fixed to the panhard bar, which determine a rotation of the two rotating hubs fixed to the two angular sensors 32, as the measurement is taken both in relation to the chassis 15 and in relation to the axle 11.

It has been noticed how in a suspended axle for industrial vehicles of the type with articulated connections, a sensor system according to the present invention can be fitted with extreme ease. This sensor system is particularly advantageous as, in addition to being simpler and more reliable, it does not require variations in the structure of the axle, but is placed between the end joints of the panhard bar.

Moreover, it is fitted in an area protected by the axle, being placed above the axle, against the panhard bar. It is simple to install and being symmetrical, it is particularly simple. Moreover, it can be installed on any type of chassis irrespective of its width.

The presence of the laminas makes a simple elastic coupling that easily follows the movements of the parts, while providing the utmost precision to the relative angular rotation measurements between the parts. The sensors are in no way overloaded by any excursions of the parts and hence the measurement is not misrepresented.

A device thus conceived may undergo further numerous modifications and variants, all falling within the scope of the invention; moreover, all parts may be replaced by others that are technically equivalent. Furthermore, the materials used, as well as the dimensions, may be any whatsoever according to the technical requirements.

What is claimed is:

1. A system for sensing a spatial position of a suspended axle in an industrial vehicle comprising two angular sensors (32) fitted on opposite pins (26), each of which is provided with a spherical coupling (27) for a panhard bar (16), having a first end and a second end, connected between an axle (11) and a chassis (15) of said industrial vehicle, said angular sensors (32) being capable of detecting angular oscillations of said panhard bar (16) in relation to said axle (11) and said chassis (15) of said industrial vehicles, each of said angular sensors (32) being interposed between said axle (11) and chassis (15) of said industrial vehicle, said system having elastic laminas (35, 36) and a rotating hub (34) for transmitting oscillations of said panhard bar to each of said angular sensors.

2. The system according to claim 1, wherein each of said angular sensors (32) include a pair of said elastic laminas (35, 36), each pair of said elastic laminas being connected to a lateral surface of the panhard bar (16), and partially overlapping one another and fixed at a first end to one of said angular sensors (32) and at a second end to said surface of said panhard bar (16).

3. The system according to claim 1, wherein each pin (26) carries a support (31*a*, 31*b*) supporting a bearing (33) which in turn supports the respective rotating hub (34), each of said angular sensors (32) has a rotating portion fixed to the respective rotating hub (34), and a fixed portion fixed to the respective support (31*a*, 31*b*).

4. The system according to claim 3, wherein said rotating portion of each of said sensors (32) includes a drive pin (40) fixed to the respective rotating hub (34).

* * * * *